United States Patent [19]

Wilkinson et al.

[11] Patent Number: 5,874,182

[45] Date of Patent: *Feb. 23, 1999

[54] METHOD AND APPARATUS FOR REDUCING REACTANT CROSSOVER IN A LIQUID FEED ELECTROCHEMICAL FUEL CELL

[75] Inventors: David P. Wilkinson, North Vancouver, Canada; Mark C. Johnson, Phoenix, Ariz.; Kevin M. Colbow, North Vancouver; Stephen A. Campbell, Coquitlam, both of Canada

[73] Assignee: Ballard Power Systems Inc., Burnaby, Canada

[*] Notice: This patent issued on a continued prosecution application filed under 37 CFR 1.53(d), and is subject to the twenty year patent term provisions of 35 U.S.C. 154(a)(2).

[21] Appl. No.: 939,673

[22] Filed: Sep. 29, 1997

Related U.S. Application Data

[63] Continuation of Ser. No. 574,262, Dec. 18, 1995, Pat. No. 5,672,439.

[51] Int. Cl.$^6$ .................................................. H01M 8/10
[52] U.S. Cl. ........................... 429/30; 429/40; 429/42; 429/44
[58] Field of Search .................. 429/30, 40, 41, 429/42, 44

[56] References Cited

U.S. PATENT DOCUMENTS

| | | | |
|---|---|---|---|
| 4,457,987 | 7/1984 | Horiba et al. | 429/41 |
| 5,035,962 | 7/1991 | Jensen | 429/40 |
| 5,068,161 | 11/1991 | Keck et al. | 429/44 |
| 5,132,193 | 7/1992 | Reddy et al. | 429/13 |
| 5,185,218 | 2/1993 | Brokman et al. | 429/27 |
| 5,277,996 | 1/1994 | Marchetti et al. | 429/44 |
| 5,316,871 | 5/1994 | Swarthirajan et al. | 429/33 |
| 5,409,785 | 4/1995 | Nakano et al. | 429/33 |
| 5,472,799 | 12/1995 | Watanabe | 429/30 |
| 5,501,915 | 3/1996 | Hards et al. | 429/44 X |
| 5,523,177 | 6/1996 | Kosek et al. | 429/40 |
| 5,573,866 | 11/1996 | Van Dine et al. | 429/13 |
| 5,672,439 | 9/1997 | Wilkinson et al. | 429/40 |

FOREIGN PATENT DOCUMENTS

| | | |
|---|---|---|
| 0 090 358 | 10/1983 | European Pat. Off. . |
| 6-203852 | 10/1994 | Japan . |
| 1130733 | 10/1968 | United Kingdom . |

OTHER PUBLICATIONS

Surampudi et al., "Advances in direct oxidation methanol fuel cells", *Journal of Power Sources*, vol. 47, pp. 377–385 (1994). (Month Unknown).

Pu et al., "A Methanol Impermeable Proton Conducting Composite Electrolyte System", *J. Electrochem. Soc.*, vol 142, No. 7, pp. L119–L120. (Jul. 1995).

"Dependence of performance of solid polymer electrolyte fuel cells with low platinum loading on morphologic characteristics of the electrodes", J. Applied Electrochem., vol. 21, No. 7, pp. 597–605, Ticianelli et al., Jun. 1991.

"Recent Advances in PEM Liquid–Feed Direct Methanol Fuel Cells", 11$^{th}$ Annual Battery Conference Applications and Advances, pp. 113–122, Narayanan et al., 1996. (Month Unknown).

"Effect of the Electrode Structure on the electrocatalytic Oxidation of Low–Weight Alcohols. Applications to the Direct Alcohol Fuel Cell", Proceedings of the Electrochemical Society, vol. 94–23, pp. 275–293, Laborde et al., 1994. (Month Unknown).

*Primary Examiner*—Stephen Kalafut
*Attorney, Agent, or Firm*—McAndrews, Held & Malloy, Ltd.

[57] ABSTRACT

In an electrochemical fuel cell, a sufficient quantity of catalyst, effective for promoting the reaction of reactant supplied to an electrode, is disposed within the volume of the electrode so that a reactant introduced at a first major surface of the electrode is substantially completely reacted upon contacting the second major surface. Crossover of reactant from one electrode to the other electrode through the electrolyte in an electrochemical fuel cell is thereby reduced.

19 Claims, 3 Drawing Sheets

METHOD AND APPARATUS FOR REDUCING REACTANT CROSSOVER IN A LIQUID FEED ELECTROCHEMICAL FUEL CELL

CROSS-REFERENCE TO RELATED APPLICATION

This application is a continuation of U.S. patent application Ser. No. 08/574,262 filed Dec. 18, 1995, entitled "Method and Apparatus for Reducing Reactant Crossover in an Electrochemical Fuel Cell", to issue as U.S. Pat. No. 5,672,439 on Sep. 30, 1997.

FIELD OF THE INVENTION

The invention relates generally to electrochemical fuel cells and, more particularly, to a fuel cell with an electrode having catalyst disposed within the volume between its major surfaces. A method and apparatus for reducing reactant crossover from one electrode to the other in an electrochemical fuel cell is provided.

BACKGROUND OF THE INVENTION

Electrochemical fuel cells convert fuel and oxidant to electricity and reaction product. Fluid reactants are supplied to a pair of electrodes which are in contact with and separated by an electrolyte. The electrolyte may be a solid or a liquid (supported liquid matrix). Solid polymer electrochemical fuel cells generally employ a membrane electrode assembly comprising a solid ionomer or ion-exchange membrane disposed between two planar electrodes. The electrodes typically comprise an electrode substrate and an electrocatalyst layer disposed upon one major surface of the electrode substrate. The electrode substrate typically comprises a sheet of porous, electrically conductive material, such as carbon fiber paper or carbon cloth. The layer of electrocatalyst is typically in the form of finely comminuted metal, typically platinum, and is disposed on the surface of the electrode substrate at the interface with the membrane electrolyte in order to induce the desired electrochemical reaction. In a single cell, the electrodes are electrically coupled to provide a path for conducting electrons between the electrodes through an external load.

At the anode, the fuel moves through the porous anode substrate and is oxidized at the anode electrocatalyst layer. At the cathode, the oxidant moves through the porous cathode substrate and is reduced at the cathode electrocatalyst layer.

Electrochemical fuel cells most commonly employ gaseous fuels and oxidants, for example, those operating on molecular hydrogen as the fuel and oxygen in air or a carrier gas (or substantially pure oxygen) as the oxidant. The anode and cathode reactions in hydrogen/oxygen fuel cells are shown in the following equations:

Anode reaction: $H_2 \rightarrow 2H^+ + 2e^-$

Cathode reaction: $\frac{1}{2}O_2 + 2H^+ + 2e^- \rightarrow H_2O$

The catalyzed reaction at the anode produces hydrogen cations (protons) from the fuel supply. The ion-exchange membrane facilitates the migration of protons from the anode to the cathode. In addition to conducting protons, the membrane isolates the hydrogen-containing gaseous fuel stream from the oxygen-containing gaseous oxidant stream. At the cathode electrocatalyst layer, oxygen reacts with the protons that have crossed the membrane to form water as the reaction product.

In liquid feed electrochemical fuel cells, one or more of the reactants is introduced to the electrocatalyst in the liquid form. Examples of electrochemical fuel cells which can be operated with a liquid fuel feed are those employing a lower alcohol, most commonly methanol, as the fuel supplied to the anode (so-called "direct methanol" fuel cells) and oxygen to the cathode. In fuel cells of this type the reaction at the anode produces protons, as in the hydrogen/oxygen fuel cell described above, however the protons (along with carbon dioxide) arise from the oxidation of methanol. An electrocatalyst promotes the methanol oxidation at the anode. The methanol may alternatively be supplied to the anode as vapor, but it is generally advantageous to supply the methanol to the anode as a liquid, preferably as an aqueous solution. In some situations, an acidic aqueous methanol solution is the preferred feed to the anode. The anode and cathode reactions in a direct methanol fuel cell are shown in the following equations:

Anode reaction: $CH_3OH + H_2O \rightarrow 6H^+ + CO_2 + 6e^-$

Cathode reaction: $\frac{3}{2}O_2 + 6H^+ + 6e^- \rightarrow 3H_2O$

Overall reaction: $CH_3OH + \frac{3}{2}O_2 \rightarrow CO_2 + 2H_2O$

The protons formed at the anode electrocatalyst migrate through the ion-exchange membrane from the anode to the cathode, and at the cathode electrocatalyst layer, the oxidant reacts with the protons to form water.

Other non-alcohol fuels may be used in liquid feed fuel cells, for example formic acid. The oxidant may also be supplied as a liquid, for example, as an organic fluid with a high oxygen concentration (see U.S. Pat. No. 5,185,218), or as a hydrogen peroxide solution.

In electrochemical fuel cells employing liquid or solid electrolytes and gaseous or liquid reactant streams, crossover of a reactant from one electrode to the other is generally undesirable. Reactant crossover may occur if the electrolyte is permeable to the reactant, that is, some of a reactant introduced at a first electrode of the fuel cell may pass through the electrolyte to the second electrode, instead of reacting at the first electrode. Reactant crossover typically causes a decrease in both reactant utilization efficiency and fuel cell performance. Fuel cell performance is defined as the voltage output from the cell at a given current density or vice versa; the higher the voltage at a given current density or the higher the current density at a given voltage, the better the performance.

In solid polymer electrochemical fuel cells the ion-exchange membrane may be permeable to one or more of the reactants. For example, ione-xchange membranes typically employed in solid polymer electrochemical fuel cells are permeable to methanol, thus methanol which contacts the membrane prior to participating in the oxidation reaction can cross over to the cathode side. Diffusion of methanol fuel from the anode to the cathode leads to a reduction in fuel utilization efficiency and to performance losses (see, for example, S. Surampudi et al., Journal of Power Sources, vol. 47, 377–385 (1994) and C. Pu et al., Journal of the Electrochemical Society, vol. 142, L119–120 (1995)).

Fuel utilization efficiency losses arise from methanol diffusion away from the anode because some of the methanol which would otherwise participate in the oxidation reaction at the anode and supply electrons to do work through the external circuit is lost. Methanol arriving at the cathode may be lost through vaporization into the oxidant stream, or may be oxidized at the cathode electrocatalyst, consuming oxidant, as follows:

$CH_3OH + \frac{3}{2}O_2 \rightarrow CO_2 + 2H_2O$

Methanol diffusion to the cathode may lead to a decrease in fuel cell performance. The oxidation of methanol at the cathode reduces the concentration of oxygen at the electrocatalyst and may affect access of the oxidant to the electrocatalyst (mass transport issues). Further, depending upon the nature of the cathode electrocatalyst and the oxidant supply, the electrocatalyst may be poisoned by methanol oxidation products, or sintered by the methanol oxidation reaction.

The electrode structures presently used in direct methanol solid polymer fuel cells were originally developed for hydrogen/oxygen fuel cells. The anode electrocatalyst which promotes the oxidation of methanol to produce protons is typically provided as a thin layer adjacent to the ion-exchange membrane (see U.S. Pat. Nos. 5,132,193 and 5,409,785 and European Patent Publication No. 0090358). The anode electrocatalyst layer is typically applied as a coating to one major surface of a sheet of porous, electrically conductive sheet material or to one surface of the ion-exchange membrane. This provides a limited reaction zone in which the methanol can be oxidized before contacting the membrane electrolyte. Thus, with this type of electrode, the methanol concentration at the anode-electrolyte interface will typically be high.

Reactant crossover may be substantially eliminated if a reactant introduced to a first major surface of a fuel cell electrode is substantially completely reacted on contacting the second major surface of the electrode. In this case essentially no unreacted reactant would be available to pass from the second surface through the electrolyte to the other electrode. As described herein, this may be accomplished by ensuring that the reactant contacts sufficient catalyst so that it is substantially completely reacted before it contacts the second surface of the electrode.

It is therefore an object of the invention to provide an electrochemical fuel cell in which crossover of a reactant from one electrode to the other is reduced.

It is a further object of the invention to provide a solid polymer electrochemical fuel cell in which a reactant is substantially completely reacted before it contacts the membrane electrolyte.

It is a still further object of the invention to provide a direct methanol solid polymer fuel cell in which methanol crossover from the anode to the cathode is reduced.

Another object of the invention is to provide a method for reducing reactant crossover in an electrochemical fuel cell.

SUMMARY OF THE INVENTION

The above and other objects are achieved by an electrochemical fuel cell in which an electrode has catalyst disposed within the volume thereof. The electrochemical fuel cell comprises:
 (a) a first electrode, the first electrode having first and second oppositely facing major surfaces, the first electrode comprising at least one layer of porous material and a sufficient quantity of catalyst disposed within the volume of the electrode between the major surfaces so that a reactant in a fluid introduced to the first major surface of the first electrode is substantially completely reacted upon contacting the second major surface of the first electrode;
 (b) a second electrode;
 (c) an electrolyte interposed between the second major surface of the first electrode and the second electrode.

In a preferred aspect of an electrochemical fuel cell the first and second oppositely facing major surfaces of the first electrode are planar.

In one embodiment the catalyst is distributed substantially uniformly within the volume between the first and second oppositely facing major surfaces of the first electrode. In an alternative embodiment the catalyst is distributed nonuniformly, such as, for example, in discrete layers or regions. The at least one layer of porous material may optionally comprise a plurality of stacked layers, and may optionally further comprise carbon particles. Suitable carbon particles include acetylene blacks, furnace blacks and graphite particles.

The electrolyte may be a liquid or a solid. With a liquid electrolyte a porous, electrically non-conductive separator is typically employed between the two electrodes. In a preferred embodiment the electrochemical fuel cell is a solid polymer fuel cell and the electrolyte comprises an ion-exchange membrane. The at least one layer of porous material is preferably electrically conductive and in a further embodiment comprises a proton conductor. Preferred porous materials comprise electrically conductive sheet material such as carbon fiber paper or carbon cloth. In an alternative aspect the at least one layer of porous material comprises carbon particles and a polymeric binder.

The fluid in which the reactant is introduced may be a liquid or a gas.

In a preferred embodiment of a liquid feed electrochemical fuel cell, the first electrode is an anode and the reactant comprises an alcohol, preferably methanol. In this case the catalyst promotes the oxidation of methanol. The fluid in which the methanol is introduced preferably comprises water and may optionally further comprise acid. In a preferred embodiment of a liquid feed direct methanol fuel cell the at least one layer of porous material comprises a plurality of carbon fiber paper layers each of the layers having two oppositely facing major surfaces, wherein catalyst is disposed on at least one major surface of each of the layers.

In any of the above embodiments of a solid polymer electrochemical fuel cell, catalyst may also be applied to the surface of the ion-exchange membrane.

The electrode has first and second oppositely facing major surfaces and comprises:
 (a) at least one layer of porous material;
 (b) a sufficient quantity of catalyst disposed within the volume of the electrode between the major surfaces so that a reactant in a fluid introduced to the first major surface of the electrode is substantially completely reacted upon contacting the second major surface of the electrode.

In a preferred aspect of an electrode the first and second oppositely facing major surfaces of the electrode are planar.

In the electrode, the porous material acts as a carrier for the catalyst, and is preferably liquid and gas permeable, to allow gas or liquid feed reactant to penetrate it and to allow gaseous products to escape. The porous material may be electrically non-conductive or preferably electrically conductive. The electrode, as a whole, is electrically conductive, however non-conductive porous material incorporating sufficient catalyst and/or other electrically conductive material to render the electrode electrically conductive may be used. The porous material may, for example, be one or more layers of electrically conductive particles, such as carbon particles, and a polymeric binder. The preferred porous material includes a sheet material which is self-supporting and has structural integrity, thus providing structural support for the adjacent ion-exchange membrane in solid polymer fuel cells. Suitable non-conductive sheet materials include expanded polytetrafluoroethylene and glass fiber matting, which preferably have electrically conductive particles, such as, for example, carbon particles associated therewith. Suitable electrically conductive sheet materials include carbon aerogel, carbon foam, carbon sponge, expanded metals and reticulated metals. Preferred sheet materials include carbon fiber paper and carbon cloth. The electrode may optionally incorporate structures to facilitate movement of gaseous products away from the electrode, for example, channels, grooves and layers or regions of different porosities.

In general, in electrochemical fuel cells, higher catalyst loadings lead to improved performance. The electrode structures described herein facilitate use of higher catalyst loadings.

In a method of substantially completely reacting a reactant in a fluid within a first electrode of an electrochemical fuel cell, the first electrode having first and second oppositely facing major surfaces, the reactant introduced at the first major surface, the first electrode comprising at least one layer of porous material and a catalyst, and the fuel cell further comprising a second electrode and an electrolyte interposed between the second major surface of the first electrode and the second electrode, the method comprises:

disposing a sufficient quantity of the catalyst within the volume of the first electrode between the major surfaces thereof such that the reactant is substantially completely reacted upon contacting the second major surface.

DETAILED DESCRIPTION OF THE PREFERRED EMBODIMENTS

Figure 1A:
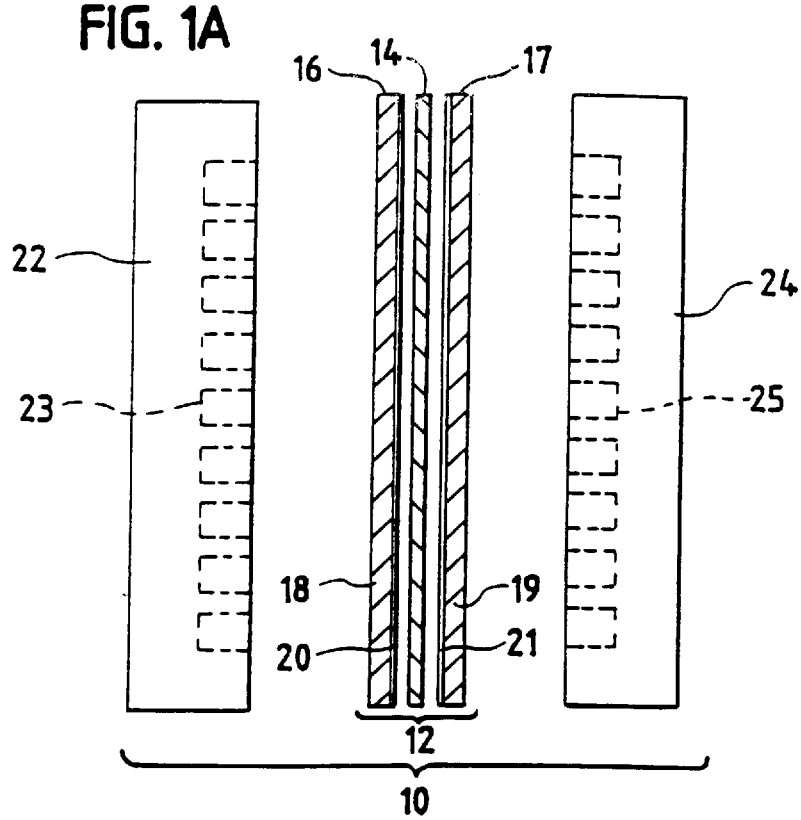
FIG. 1A is an exploded side view of a typical solid polymer electrochemical fuel cell showing a conventional membrane electrode assembly interposed between two separator plates, the separator plates having reactant flow channels formed in the surfaces for directing the reactants to the electrodes.

FIG. 1A illustrates a typical solid polymer fuel cell 10. Fuel cell 10 includes a membrane electrode assembly 12 consisting of an ion-exchange membrane 14 interposed between two electrodes, namely an anode 16 and a cathode 17. In conventional solid polymer fuel cells, anode 16 and cathode 17 comprise a substrate of porous electrically conductive sheet material, 18 and 19, respectively. Each substrate has a thin layer, 20, 21, of electrocatalyst disposed on one of the major surfaces at the interface with the membrane 14. The membrane electrode assembly 12 is typically interposed between anode flow field or separator plate 22 and cathode flow field or separator plate 24. Anode separator plate 22 has at least one fuel flow channel 23 engraved, milled or molded in its surface facing anode. Similarly, cathode separator plate 24 has at least one oxidant flow channel 25 engraved, milled or molded in its surface facing the cathode. When assembled against the cooperating surfaces of electrodes 16 and 17, channels 23 and 25 form the reactant flow field passages for the fuel and oxidant respectively.

Figure 1B:
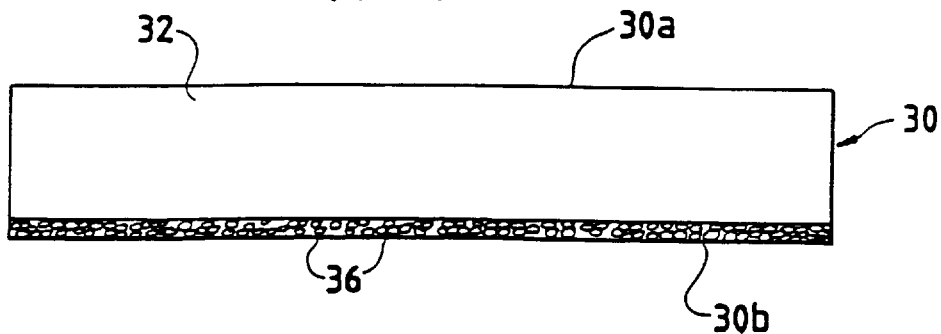
FIG. 1B is a side sectional view of a conventional (prior art) solid polymer electrochemical fuel cell electrode having the catalyst disposed in a single, discrete layer at the interface with the membrane electrolyte.

FIG. 1B shows a conventional (prior art) electrode 30 of the type typically used in solid polymer fuel cells. Electrode 30 comprises a sheet of porous, electrically conductive material 32, typically carbon fiber paper or carbon cloth. The electrode 30 has oppositely facing major planar surfaces 30a, 30b. In a conventional solid polymer fuel cell, electrode surface 30b is adjacent to the membrane electrolyte. A thin layer comprising electrocatalyst particles 36 is disposed at electrode surface 30b.

Figure 2:
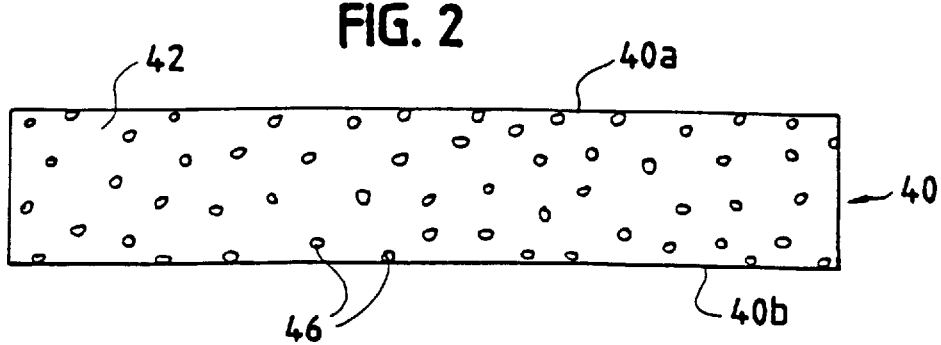
FIG. 2 is a side sectional view of an electrode having catalyst substantially uniformly distributed throughout the volume of the electrode.

FIG. 2 shows an electrode 40 comprising porous material 42. The electrode 40 has oppositely facing major planar surfaces 40a, 40b. In a direct methanol fuel cell, electrode surface 40b is adjacent to the membrane electrolyte. Catalyst particles 46, effective for promoting the oxidation of methanol, are distributed between the electrode surfaces 40a, 40b. The catalyst particles 46 may be distributed substantially uniformly throughout the volume between the electrode surfaces 40a, 40b, as shown in FIG. 2, or may be distributed nonuniformly, for example, in discrete layers or regions. Sufficient catalyst is provided so that substantially all of the methanol, which is introduced in a fluid to the electrode 40 at surface 40a is oxidized upon contacting surface 40b. The thickness of the electrode 40 and the quantity of catalyst required will depend for example on the rate of methanol supply to the electrode 40, and the rate of fluid transport through the electrode 40. In one example of an electrode 40, porous material 42 is one or more layers of carbon particles mixed with a polymeric binder, and catalyst particles 46 are distributed throughout porous material 42. In another example of an electrode 40, porous material 42 is glass fiber mat or expanded (porous) polytetrafluoroethylene and a matrix of carbon particles and a polymeric binder which, along with catalyst particles 46, is distributed throughout the thickness of the mat. In preferred example of an electrode 40, porous material 42 is carbon cloth and a matrix of carbon particles and a polymeric binder which, along with catalyst particles 46, is distributed throughout the thickness of the carbon cloth.

Figure 3:
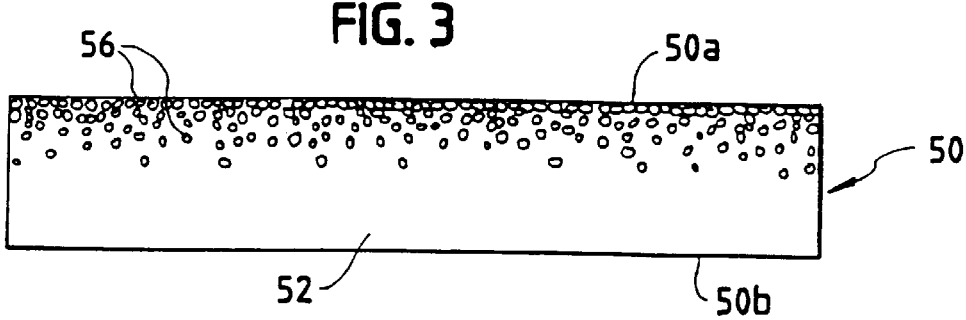
FIG. 3 is a side sectional view of an electrode having a catalyst layer impregnated into, and disposed in the volume underlying, the surface of the electrode facing away from the membrane electrolyte.

FIG. 3 shows an electrode 50 comprising porous electrically conductive material 52. The electrode 50 has oppositely facing major planar surfaces 50a, 50b. In a direct methanol solid polymer fuel cell, electrode surface 50b is adjacent the membrane electrolyte. Catalyst particles 56, effective for promoting the oxidation of methanol, are concentrated at electrode surface 50a. Sufficient catalyst is provided so that substantially all of the methanol, which is introduced in a fluid to the electrode 50 at surface 50a, is oxidized upon contacting surface 50b. In an example of an electrode 50, catalyst particles 56 are applied to and impregnated into surface 50a of a porous electrically conductive material sheet material such as carbon fiber paper.

Figure 4:
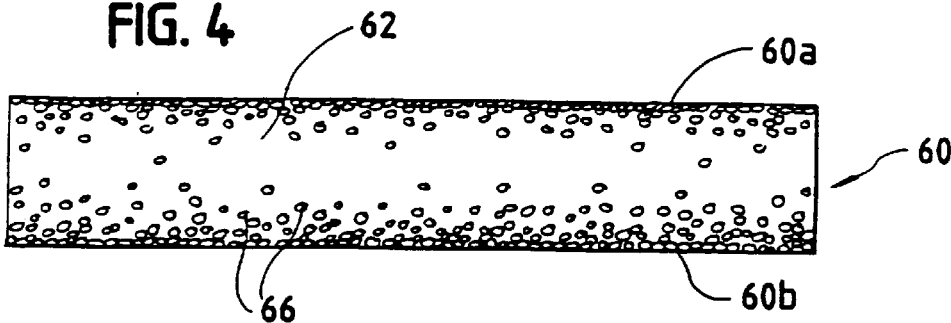
FIG. 4 is a side sectional view of an electrode having a catalyst layer impregnated into both surfaces of the electrode.

FIG. 4 shows an electrode 60 comprising porous electrically conductive material 62. The electrode 60 has oppositely facing major planar surfaces 60a, 60b. In a direct methanol solid polymer fuel cell electrode, surface 60b is adjacent to the membrane electrolyte. Catalyst particles 66, effective for promoting the oxidation of methanol, are concentrated at electrode surfaces 60a, 60b. Sufficient catalyst is provided so that substantially all of the methanol, which is introduced in a fluid to electrode 60 at surface 60a is oxidized upon contacting surface 60b. In an example of an electrode 60, catalyst particles 66 are applied to and impregnated into both surfaces 60a, 60b of porous electrically conductive material 62.

Figure 5:
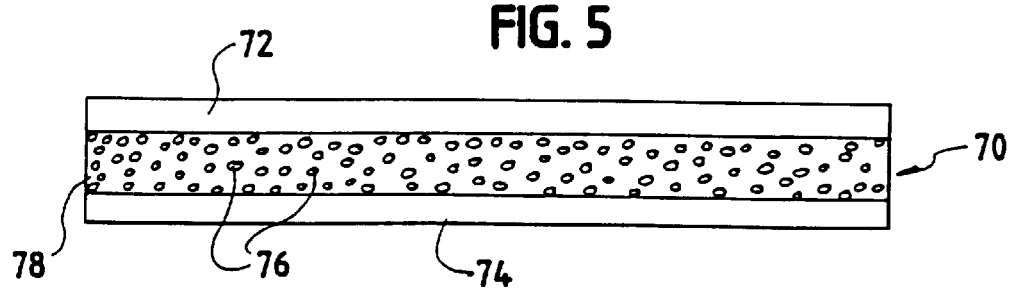
FIG. 5 is a side sectional view of an electrode comprising two layers of porous electrically conductive material and an active layer comprising catalyst interposed between them.

FIG. 5 shows a multi-layer electrode 70 comprising two layers of porous electrically conductive sheet material 72, 74. In a direct methanol solid polymer fuel cell layer 74 is adjacent to the membrane electrolyte. An active layer 78, comprising catalyst particles 76 is interposed between layers 72, 74. The layers 72, 74 provide structural support for the catalyst-containing layer 78. Sufficient catalyst is provided so that substantially all of the methanol, introduced in a fluid at layer 72 is oxidized upon contacting layer 74.

Figure 6:
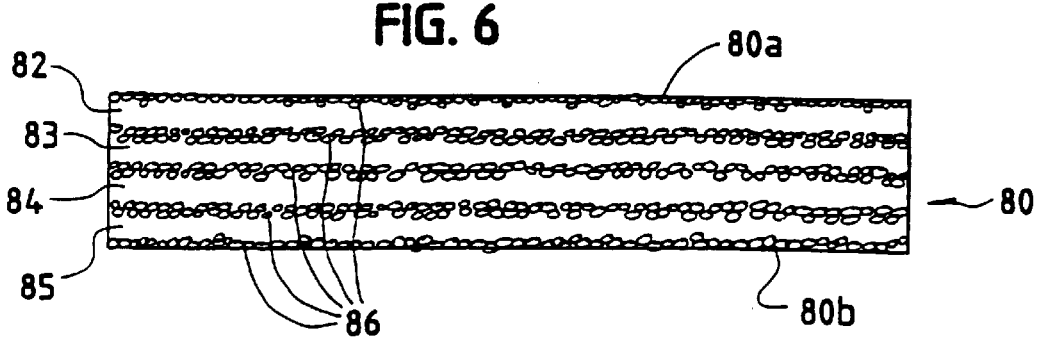
FIG. 6 is a side sectional view of a multi-layer electrode comprising four layers of porous electrically conductive material and catalyst disposed at both surfaces of each layer.

FIG. 6 shows a multi-layer electrode 80 comprising four layers of porous electrically conductive sheet material 82, 83, 84, 85. The electrode 80 has oppositely facing major planar surfaces 80a, 80b. In a direct methanol solid polymer fuel cell electrode, surface 80b is disposed adjacent the membrane electrolyte. Catalyst particles 86 are disposed at both major planar surfaces of each layer. Sufficient catalyst is provided so that substantially all of the methanol, which is introduced in a liquid to the electrode 80 at surface 80a is oxidized upon contacting surface 80b.

Figure 7:
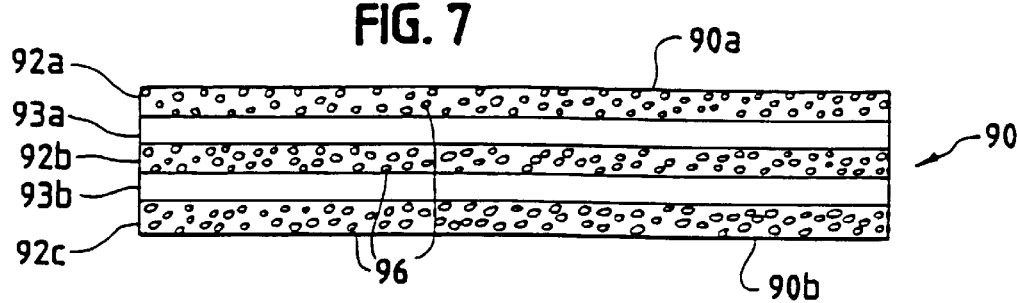
FIG. 7 is a side sectional view of a multi-layer electrode comprising five layers of porous electrically conductive material and catalyst disposed within alternate layers.

FIG. 7 shows a multi-layer electrode 90 comprising five stacked layers of porous electrically conductive sheet material 92a, 92b, 92c, 93a, 93b. The electrode 90 has oppositely facing major planar surfaces 90a, 90b. In a direct methanol solid polymer fuel cell electrode, surface 90b is disposed adjacent the membrane electrolyte. Catalyst particles 96 are disposed in layers 92a, 92b and 92c. Sufficient catalyst is provided so that substantially all of the methanol, which is introduced in a fluid to the electrode 90 at surface 90a is oxidized upon contacting surface 90b. In an example of an electrode 90 structured to facilitate escape of gaseous carbon dioxide product, porous layers 92a, 92b, 92c are carbon cloth filled with a matrix of carbon particles and a polymeric binder, and catalyst particles 96 are distributed throughout the thickness of the layers 92a, 92b, 92c. Porous layers 93a and 93b are carbon cloth which is not filled with a matrix and catalyst particles, and are therefore more porous.

Figure 8:
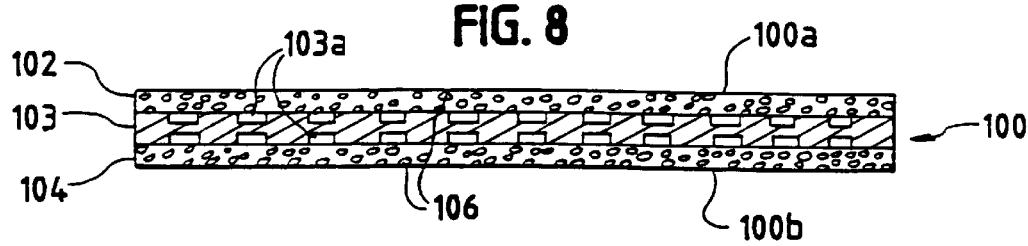
FIG. 8 is a side sectional view of a multi-layer electrode structured to facilitate escape of gaseous products, comprising three layers of porous electrically conductive material.

FIG. 8 shows a multi-layer electrode 100 structured to facilitate escape of gaseous carbon dioxide product. Electrode 100 comprises three stacked layers of porous electrically conductive sheet material 102, 103, 104, and has oppositely facing major planar surfaces 100a, 100b. In a direct methanol solid polymer fuel cell electrode, surface 100b is disposed adjacent the membrane electrolyte. Catalyst particles 106 are disposed in layers 102 and 104. Sufficient catalyst is provided so that substantially all of the methanol, which is introduced in a fluid to electrode 100 at surface 100a is oxidized upon contacting surface 100b. Layer 103 has channels 103a formed in its major planar surfaces to facilitate gas transport. In an example of an electrode 100, porous material 102 and 104 is carbon cloth filled with a matrix of carbon particles and a polymeric binder, and catalyst particles 106 are distributed throughout the thickness of layers 102, 104. Layer 103 is carbon fiber paper with channels 103a formed in the surfaces thereof.

Additional materials, such as hydrophobic or hydrophillic polymers, and particulate fillers, may optionally be incorporated into the electrode, for example, to control gas and liquid transport in the electrode.

In the direct methanol solid polymer fuel cells described herein, protons are generated by oxidation of methanol at catalyst sites which are remote from the anode-membrane interface. A mechanism is provided for transporting protons from the catalyst sites to the membrane electrolyte. In preferred embodiments, the anode further comprises proton conductive material which provides a path for transport of protons from the catalyst sites to the membrane electrolyte. For example, proton conductive material may be impregnated into the at least one porous layer of the anode or may be applied in a mixture with the catalyst. The proton conductive material may, for example, be an ionomer such as a sulfonated fluoroionomer, for example Nafion. Alternatively, or in addition, the methanol may be supplied to the anode in aqueous acidic solution, the aqueous acid thereby providing a path for transport of protons from the catalyst sites to the membrane electrolyte. Suitable acids include sulfuric acid and perchloric acid.

Any catalyst which is effective for the oxidation of methanol may be employed in the anode of a direct methanol fuel cell. For example, the catalyst can be a metal black such as platinum, a mixture of metals, an alloy, a catalyst mixed with additives to promote electrocatalytic activity and/or inhibit catalyst poisoning, or a supported catalyst such as, for example, a noble metal on a carbon support.

EXAMPLE 1

Comparison of Methanol Utilization (a) Preparation of a Conventional Anode

A single layer of carbon supported platinum ruthenium catalyst (Pt/Ru/C: 20/10/70%) was applied to one surface of a sheet of carbon fiber paper (14×14 cm, thickness 0.27 mm, Grade CFP090) to give a platinum loading of 1.80 mg/cm$^2$.

(b) Preparation of a Multi-layer Anode

Carbon supported platinum ruthenium catalyst (Pt/Ru/C: 20/10/70%) was applied to both surfaces of three sheets of carbon fiber paper (14×14 cm, thickness 0.10 mm, Grade CFP030), and the sheets were stacked together to give a multi-layer anode with the same total platinum loading as in Example 1(a) above, t hat is 1.80 mg/cm$^2$.

Each of the above anodes was tested in a liquid feed direct methanol fuel cell employing Nafion 117 as the ion-exchange membrane (electrolyte) and a platinum black cathode (4 mg/cm$^2$ platinum loading). In both cases the fuel cell was supplied with a fixed amount of fuel which was recirculated past the anode. The fixed amount of fuel was 250 mL of aqueous 2M methanol solution with a 0.5M sulfuric acid concentration, and the operating conditions were as follows:

current density—constant at 200 mA/cm$^2$ temperature=115° C.

air inlet pressure=35 psig air stoichiometry=3

Figure 9:
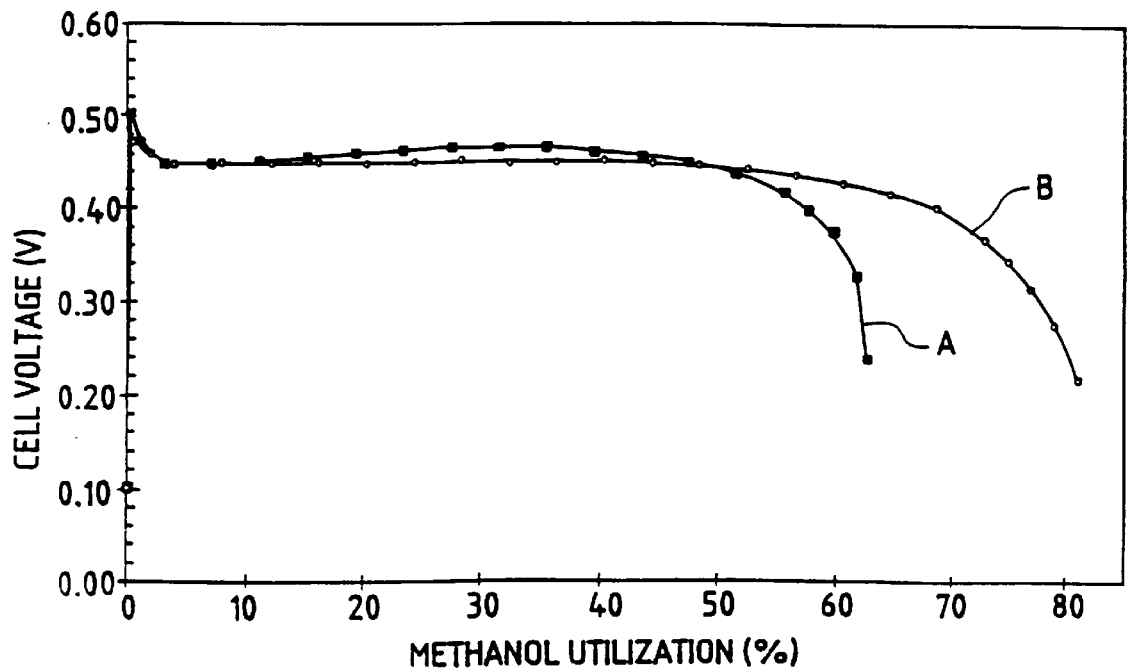
FIG. 9 is a plot of cell voltage versus methanol utilization for a fuel cell with the conventional anode (plot A) shown in FIG. 1B and with a multi-layer anode (plot B) shown in FIG. 6.

FIG. 9 is a plot of cell voltage versus methanol utilization for a fuel cell with a conventional (plot A) and multi-layer anode (plot B) prepared as described in Example 1. The quantity of electricity which would be produced if all of the methanol were used (with complete oxidation) can be calculated. The ratio of the observed output (current×time) to the theoretical output of the fuel cell is expressed as a percentage methanol utilization in FIG. 9. For the conventional anode, the cell voltage drops sharply when the utilization approaches 60%. This indicates an inadequate concentration of methanol at the electrode. For the multi-layer anode the voltage drop occurs closer to 80% utilization. The primary reason for fuel utilization loss (that is, the fuel cell producing less current than is theoretically possible) is methanol diffusion to the cathode. Additional contributions to the loss may be due to incomplete oxidation of methanol-less than its electrochemical equivalent of six electrons per methanol molecule. The results indicate that the multi-layer anode improves fuel utilization and reduces methanol diffusion to the cathode.

As used herein the term "substantially completely reacted" indicates that the amount of reactant remaining unreacted is insufficient to detrimentally affect fuel cell performance.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A liquid feed electrochemical fuel cell comprising:
    (a) a first electrode, said first electrode comprising a quantity of catalyst and a self-supporting porous sheet material having first and second oppositely facing major surfaces, said first electrode fluidly connected to a source of liquid reactant;
    (b) a second electrode;
    (c) an ion-exchange membrane interposed between said first electrode and said second electrode;
wherein said catalyst is distributed through the thickness of said sheet material between said major surfaces.

2. The liquid feed electrochemical fuel cell of claim 1 wherein said catalyst is nonuniformly distributed throughout the thickness of said sheet material.

3. The liquid feed electrochemical fuel cell of claim 1 wherein said sheet material is selected from the group consisting of carbon cloth, carbon fiber paper, glass fiber mat, expanded polytetrafluoroethylene, carbon aerogel, carbon foam, carbon sponge, expanded metal and reticulated metal.

4. A liquid feed electrochemical fuel cell comprising:
    (a) a first electrode having first and second oppositely facing major surfaces, and comprising a quantity of catalyst;
    (b) a second electrode;
    (c) an ion-exchange membrane interposed between said first electrode and said second electrode;
wherein said catalyst is distributed in a plurality of layers within the volume of said first electrode between said major surfaces.

5. The liquid feed electrochemical fuel cell of claim 4 wherein said first electrode comprises a plurality of stacked layers of porous sheet material.

6. The liquid feed electrochemical fuel cell of claim 5 wherein said layers have different fluid transport properties.

7. The liquid feed electrochemical fuel cell of claim 6 wherein said layers have different porosities.

8. The liquid feed electrochemical fuel cell of claim 5 wherein at least one of said layers has grooves formed therein.

9. The liquid feed electrochemical fuel cell of any one of claims 1–8 wherein said fuel cell is a direct methanol fuel cell and said first electrode is an anode.

10. The liquid feed electrochemical fuel cell of any one of claims 1–8 wherein said first electrode is an anode and said anode further comprises a proton conductor for ionically connecting said catalyst to said ion exchange membrane.

11. A method of reducing reactant crossover from a first electrode to a second electrode in a liquid feed electrochemical fuel cell, said fuel cell comprising an ion-exchange membrane interposed between said first and second electrodes, the method comprising:
    supplying a liquid stream comprising a reactant to said first electrode; and
    reacting said reactant in the presence of a catalyst disposed within the volume of said first electrode such that substantially none of said reactant contacts said ion-exchange membrane.

12. The method of claim 11 wherein said method comprises controlling the rate of supply of said reactant to said electrode such that substantially none of said reactant contacts said ion-exchange membrane.

13. The method of claim 11 wherein said reactant is a fuel and said first electrode is an anode.

14. The method of claim 13 wherein said anode comprises a proton conductor.

15. The method of claim 13 wherein said reactant is methanol.

16. The method of claim 15 wherein said liquid stream further comprises water.

17. The method of claim 16 wherein said liquid stream further comprises acid.

18. The method of claim 11 wherein said reactant is an oxidant and said first electrode is a cathode.

19. A method of reducing reactant crossover from a first electrode to a second electrode of a liquid feed electrochemical fuel cell, said first electrode having first and second oppositely facing major surfaces and comprising a catalyst, said fuel cell further comprising an ion-exchange membrane interposed between said second major surface of said first electrode and said second electrode, the method comprising:
    introducing liquid stream comprising a reactant to said first major surface of said first electrode,
    disposing a sufficient quantity of said catalyst within the volume of said first electrode between said major surfaces such that said reactant is substantially completely reacted upon contacting said second major surface.

* * * * *